(12) United States Patent
Stewen et al.

(10) Patent No.: US 7,867,304 B2
(45) Date of Patent: Jan. 11, 2011

(54) METHOD FOR CLEANING THE FILTERS OF A VACUUM CLEANER AND VACUUM CLEANER FOR CARRYING OUT SAID METHOD

(75) Inventors: Christian Stewen, Marbach a.N. (DE); Uli Haeussermann, Fellbach (DE)

(73) Assignee: Alfred Kaercher GmbH & Co. KG, Winnenden (DE)

( * ) Notice: Subject to any disclaimer, the term of this patent is extended or adjusted under 35 U.S.C. 154(b) by 476 days.

(21) Appl. No.: 11/973,881

(22) Filed: Oct. 9, 2007

(65) Prior Publication Data

US 2008/0092498 A1 Apr. 24, 2008

Related U.S. Application Data

(63) Continuation of application No. PCT/EP2006/000671, filed on Jan. 26, 2006.

(30) Foreign Application Priority Data

Apr. 11, 2005 (DE) .................. 10 2005 017 702

(51) Int. Cl.
*A47L 9/00* (2006.01)
*A47L 9/14* (2006.01)
(52) U.S. Cl. .................. 55/302; 55/DIG. 3; 15/352; 96/403
(58) Field of Classification Search ............ 55/302, 55/312, 313, 429, DIG. 3, DIG. 34; 15/320, 15/353, 321, 339, 352; 210/97, 109, 110, 210/130, 433.1, 443, 445; 96/399, 400, 421, 96/403
See application file for complete search history.

(56) References Cited

U.S. PATENT DOCUMENTS 2,591,567 A 4/1952 Lofgren et al.

(Continued)

FOREIGN PATENT DOCUMENTS

DE 210 658 6/1909

(Continued)

*Primary Examiner*—Duane Smith
*Assistant Examiner*—Minh-Chau Pham
(74) *Attorney, Agent, or Firm*—Lipsitz & McAllister, LLC

(57) ABSTRACT

The invention relates to a method for cleaning the filter of a vacuum cleaner which has a dirt collecting container with a suction inlet, to which a suction tube is connected, the dirt collecting container being connected to at least one suction unit via at least one filter and at least one suction line, and at least one closing valve closing an external air inlet, via which the suction line is connected to an external air supply, in which method, for cleaning the filter, the closing valve is opened and the side of the filter that is oriented away from the dirt collecting container is impinged upon by external air. To develop the method further in such a way that all the filters present can be flowed through by suction air during suction operation, but suction operation does not have to be noticeably interrupted for filter cleaning, it is proposed according to the invention that, by opening the closing valve, the negative pressure that forms within the suction tube at a distance of 3 cm from the suction inlet, on connecting a standard suction tube, is lowered for at least 10 ms and at most 150 ms to values of less than 40% of the value forming when the closing valves are closed. The invention also relates to a vacuum cleaner for carrying out the method.

18 Claims, 4 Drawing Sheets

U.S. PATENT DOCUMENTS

| | | | | |
|---|---|---|---|---|
| 3,509,394 | A | | 4/1970 | Heidtmann |
| 3,748,836 | A | | 7/1973 | Bachle |
| 3,994,067 | A | * | 11/1976 | Hazzard et al. ............... 30/383 |
| 4,033,732 | A | * | 7/1977 | Axelsson et al. .............. 95/280 |
| 4,124,915 | A | | 11/1978 | Schlicher |
| 4,124,916 | A | * | 11/1978 | Fromknecht ................. 15/339 |
| 4,171,208 | A | * | 10/1979 | Lowder ....................... 96/406 |
| 4,277,265 | A | | 7/1981 | Leinfelt |
| 4,329,161 | A | | 5/1982 | Osborn |
| RE31,417 | E | | 10/1983 | Huber |
| 4,482,129 | A | | 11/1984 | Baker et al. |
| 4,581,135 | A | * | 4/1986 | Gerulis ....................... 210/108 |
| 4,719,662 | A | | 1/1988 | Horak et al. |
| 4,733,326 | A | | 3/1988 | Harsch et al. |
| 4,921,510 | A | | 5/1990 | Plooy |
| 5,002,594 | A | | 3/1991 | Merritt |
| 5,178,652 | A | | 1/1993 | Hüttlin |
| 5,246,205 | A | * | 9/1993 | Gillingham et al. ......... 251/334 |
| 5,368,060 | A | | 11/1994 | Worrall et al. |
| 5,882,180 | A | | 3/1999 | Kawaguchi et al. |
| 5,975,062 | A | | 11/1999 | Bonse et al. |
| 6,406,505 | B1 | | 6/2002 | Oh et al. |
| 6,458,178 | B1 | | 10/2002 | Dietz et al. |
| 6,517,325 | B2 | | 2/2003 | Tsuru et al. |
| 6,640,385 | B2 | | 11/2003 | Oh et al. |
| 6,782,583 | B2 | | 8/2004 | Oh |
| 6,936,161 | B2 | * | 8/2005 | Wright et al. ................. 210/97 |
| 7,340,797 | B2 | * | 3/2008 | Theiss et al. .................. 15/353 |
| 7,647,672 | B2 | * | 1/2010 | Nam et al. .................... 15/352 |
| 2002/0066262 | A1 | | 6/2002 | Oh |
| 2002/0088078 | A1 | | 7/2002 | Oh et al. |
| 2002/0124729 | A1 | | 9/2002 | Dudley |
| 2003/0167590 | A1 | | 9/2003 | Oh |
| 2005/0011036 | A1 | | 1/2005 | McCutchen |
| 2005/0254270 | A1 | | 11/2005 | Melchert et al. |
| 2009/0027823 | A1 | | 1/2009 | Follic et al. |
| 2009/0205159 | A1 | | 8/2009 | Stewen et al. |

FOREIGN PATENT DOCUMENTS

| | | |
|---|---|---|
| DE | 1 800 480 | 6/1970 |
| DE | 2 106 058 | 9/1971 |
| DE | 91 04 127 | 7/1991 |
| DE | 41 38 223 | 2/1993 |
| DE | 298 23 411 | 5/1999 |
| DE | 199 49 095 | 4/2001 |
| DE | 200 10 608 | 12/2001 |
| DE | 100 56 935 | 2/2002 |
| DE | 101 40 351 | 6/2002 |
| DE | 101 01 219 | 7/2002 |
| DE | 101 50 257 | 7/2002 |
| DE | 102 40 618 | 9/2003 |
| DE | 10 2005 029 606 | 1/2006 |
| DE | 10 2004 056 076 | 5/2006 |
| DE | 10 2005 035 884 | 2/2007 |
| EP | 0 289 987 | 11/1988 |
| EP | 0 955 003 | 11/1999 |
| EP | 1 166 705 | 1/2002 |
| EP | 1 656 872 | 5/2006 |
| GB | 956764 | 4/1964 |
| GB | 2 337 922 | 12/1999 |
| JP | 08038401 | 2/1996 |
| JP | 2002028107 | 1/2002 |
| JP | 2006181228 | 7/2006 |
| WO | 95/10972 | 4/1995 |
| WO | 95/27431 | 10/1995 |
| WO | 97/19630 | 6/1997 |
| WO | 01/74493 | 10/2001 |
| WO | 2004/100752 | 11/2004 |

* cited by examiner

METHOD FOR CLEANING THE FILTERS OF A VACUUM CLEANER AND VACUUM CLEANER FOR CARRYING OUT SAID METHOD

This application is a continuation of international application number PCT/EP2006/000671 filed on Jan. 26, 2006.

The present disclosure relates to the subject matter disclosed in international application number PCT/EP2006/000671 of Jan. 26, 2006 and German application number 10 2005 017 702.6 of Apr. 11, 2005, which are incorporated herein by reference in their entirety and for all purposes.

BACKGROUND OF THE INVENTION

The invention relates to a method for cleaning the filters of a vacuum cleaner which has a dirt collecting container with a suction inlet, to which a suction tube is connected, the dirt collecting container being in connection with at least one suction unit via at least one filter and at least one suction line following the latter, and at least one closing valve closing an external air inlet, via which the suction line is connected to an external air supply, and in which method, for cleaning the at least one filter, at least one closing valve is opened and the side of the at least one filter that is oriented away from the dirt collecting container is impinged upon by external air.

The invention also relates to a vacuum cleaner for carrying out said method.

By means of the vacuum cleaner in question here, dirt and preferably also liquid can be sucked up by using at least one suction unit to apply negative pressure to the dirt collecting container, so that a suction flow forms. The vacuum cleaner has one or more filters, which are disposed in the flow path from the dirt collecting container to the at least one suction unit and serve for separating solid substances from the suction flow. During suction operation, dirt particles are increasingly deposited on the side of the at least one filter that is oriented toward the dirt collecting container, so that after some time the filter or filters have to be cleaned. For cleaning, the side of the filter that is oriented away from the dirt collecting container can be impinged upon by external air, by opening at least one closing valve, so that external air can flow into the at least one suction line via the external air inlet.

For cleaning a filter, it is proposed in DE 298 23 411 U1 to close the suction tube for a short time, so that a strong negative pressure forms in the dirt collecting container, and a closing valve is subsequently to be opened for a short time. The filter is then flowed through by the external air in the direction of counterflow, that is to say counter to the direction of the suction flow, so that dirt particles adhering to the filter become detached. This allows effective cleaning of the filter to be achieved, but the suction operation has to be interrupted by the user for this purpose.

In DE 199 49 095 A1, it is proposed to use two filters, which are cleaned alternatively, it being possible during the cleaning of one filter for the suction operation to be continued to a restricted extent by means of the other filter. However, this requires a complex construction, the two filters having to be of a considerable size to permit adequate suction flow during restricted suction operation. Furthermore, the alternative cleaning of one filter at a time while at the same time maintaining the suction operation by means of the other filter is prone to faults.

It is an object of the present invention to provide a filter cleaning method for a vacuum cleaner in which all the filters present can be flowed through by suction air during suction operation, but suction operation does not have to be noticeably interrupted for the user for filter cleaning.

SUMMARY OF THE INVENTION

This object is achieved according to the invention in the case of a method of the type mentioned at the beginning by providing that, by simultaneously opening all the closing valves, the negative pressure that forms within the suction tube at a distance of 3 cm from the suction inlet, on connecting a 2.5 m long suction tube that is open at its free end and has an internal diameter of 35 mm, is lowered for at least 10 ms and at most 150 ms to values of less than 40% of the value forming when the closing valves are closed.

In the case of the vacuum cleaner according to the invention, the suction air is filtered by means of the filters present, all the filters being used at the same time. This may involve a single filter or a number of filters that are flowed through simultaneously. It has been found that the at least one filter can be effectively cleaned within the shortest time without any noticeable interruption of the suction operation for the user if the negative pressure in the region of the mouth of a standard suction tube is lowered for at least 10 ms and at most 150 ms to values of less than 40% with respect to the value of the negative pressure that occurs when the closing valves are closed. A standard suction tube is understood here as meaning a suction tube with a length of 2.5 m and an internal diameter of 35 mm. Suction tubes of this type are usually used in the case of vacuum cleaners of the type in question here. They are used in particular whenever the vacuum cleaner is to be connected to a working tool, for example a drill or a masonry router, so that the dust that is produced when the working tool is used can be sucked away during the operation of the working tool. The negative pressure values stated above relate to a situation in which no tool is connected at the free end of the suction tube, that is to say the free end is open. If the suction tube is connected to a tool, a stronger negative pressure usually occurs in the region of the mouth of the suction tube. The aforementioned negative pressure values consequently form reference values to characterize the filter cleaning method and the construction of the corresponding vacuum cleaner.

It has been found that effective cleaning of the at least one filter can be ensured if the negative pressure forming in the suction tube at a distance of 3 cm from the suction inlet is lowered for at least 10 ms below a value of 40% of the value forming when the closing valves are closed. However, the lowering of the negative pressure is carried out for no longer than 150 ms, after which a stronger negative pressure already occurs in the region of the mouth of the suction tube. This ensures that there is virtually no interruption of the suction operation for the user, but rather the suction operation is continued virtually continuously. The filter cleaning is therefore performed only for fractions of a second, because the opening of the closing valve takes place for less than 150 ms. Within this time, the negative pressure is sharply lowered abruptly on the side of the at least one filter that is oriented away from the dirt collecting container, so that the entire side of the filter that is oriented away from the dirt collecting container is subjected to a pressure surge that leads to cleaning of the filter, and furthermore for a short time the filter is flowed through by the external air in a counterflow direction. Since the suction unit is also in flow communication with the filter during the opening of the closing valve, the external air flowing into the suction line for a short time is sucked away immediately, so that the negative pressure is intensified again and, as a result, the original suction flow via the filter is re-established. Accordingly, in fractions of a second, starting from the original suction flow, the at least one filter is flowed through for a short time by an external air flow and subsequently again by the suction flow. This results in an alternating mechanical loading of the filter, by which the filter cleaning is assisted.

The vacuum cleaner is preferably equipped with a single filter, which is cleaned in a short time, as described above.

It may be provided that the vacuum cleaner has a number of external air inlets, which can be respectively closed by means of a closing valve. By simultaneously opening all the closing valves, a great amount of external air can then be supplied to the at least one filter. However, this requires very exact coordination of the individual closing valves. It is more advantageous if the entire surface area of the at least one filter that is oriented away from the dirt collecting container is impinged upon by external air by opening only a single closing valve.

To be able to actuate the at least one closing valve for a very short time, it is advantageous if the closing valve is electronically actuated. For example, an electromagnet can be used, in particular a holding solenoid, with the aid of which a movable valve body can be kept in a closed position by applying a current to the electromagnet. If the closing valve is to be opened, the current supply to the electromagnet is interrupted for this purpose. The use of a holding solenoid is of particular advantage here, since it is distinguished by very low remanence, that is to say that, when the current supply is interrupted, the holding solenoid has only a very low magnetic field strength, so that the magnetic force that keeps the valve body in its closed position can be lowered to very low values within a very short time by interrupting the current supply, so that the closing valve opens abruptly.

It may be provided that the at least one closing valve is actuated in a time-controlled manner, in particular it may be provided that the closing valve is actuated at time intervals of less than 30 seconds, in particular at time intervals of less than 15 seconds, for example every 5 seconds.

The actuation of the at least one closing valve may be effected at different time intervals, for example the closing valve may at first be kept closed for a longer period of time, to then be opened briefly at a number of shorter time intervals.

Alternatively or in addition, the at least one closing valve may be electronically actuated in dependence on the pressure difference forming at the at least one filter when the closing valve is closed. For this purpose, at least one pressure sensor may be disposed respectively upstream and downstream of the filter, with the aid of which the respectively occurring negative pressure can be sensed. By comparison of the sensed pressure values, the pressure difference forming at the at least one filter can be determined. The filter gradually clogging with dirt particles forms an increasing flow resistance, so that the pressure difference forming represents a measure of the soiling of the filter. If the pressure difference reaches a predetermined value, the closing valve can be electronically actuated to clean the filter.

As mentioned at the beginning, the invention also relates to a vacuum cleaner for carrying out the aforementioned method. The vacuum cleaner comprises a dirt collecting container, which has a suction inlet, to which a suction tube is connected, and at least one suction unit which is in connection with the dirt collecting container via at least one filter and at least one suction line following the latter. The vacuum cleaner also has at least one external air inlet, via which the at least one suction line is connected to an external air supply and which can be closed by means of one or more closing valves, the closing valves having at least one fixed valve seat and a movable valve body.

To develop a vacuum cleaner of this type further in such a way that all the filters can be flowed through by suction air during suction operation, but suction operation does not have to be noticeably interrupted for filter cleaning, it is proposed according to the invention that, by simultaneously opening all the closing valves, the negative pressure that forms within the suction tube at a distance of 3 cm from the suction inlet, on connecting a 2.5 m long suction tube that is open at its free end and has an internal diameter of 35 mm, is lowered for at least 10 ms and at most 150 ms to values of less than 40% of the value forming when the closing valves are closed.

A vacuum cleaner of such a configuration has the advantage that suction operation can be continued virtually continuously, and nevertheless effective filter cleaning can be achieved, by ensuring that, although the negative pressure in the region of the mouth of a standard suction tube is lowered to values below 40% of the negative pressure that occurs when the closing valves are closed, this lowering lasts at most 150 ms. The at least one filter is consequently flowed through by external air in the direction of counterflow only for such a short time that the suction flow within the suction tube is not noticeably interrupted. The vacuum cleaner is distinguished here by a simple construction, in that all the filters present are flowed through by suction air simultaneously in suction operation. By briefly opening the at least one closing valve, the entire side of the at least one filter that is oriented away from the dirt collecting container can be impinged upon by external air. Here, external air is fed to the filter abruptly, the at least one suction unit being permanently in flow communication with the filter.

The vacuum cleaner preferably has only a single filter.

In the case of a particularly preferred embodiment of the vacuum cleaner according to the invention, the valve body of the at least one closing valve is adapted to be brought into sealing contact with the at least one valve seat while forming one or more sealing lines, the surface area delimited by the sealing lines that is subjected to a differential pressure in the closed state of the closing valve being at most half the size of a circular area having a circumference corresponding to the total length of all the sealing lines. The surface area delimited by the at least one sealing line is the surface area of the valve body that is subjected to a differential pressure in the closed state. It has been found that, by providing a sealing line that is as long as possible a great amount of external air can flow in within a very short time when the closing valve is opened. However, the path of the at least one sealing line is chosen such that it delimits a surface area that is as small as possible. Compared with a circular area having a circumference corresponding to the total length of all the sealing lines, the surface area which is subjected to pressure and is delimited by the sealing lines is at most half the size. This ensures that the valve body is subjected only to a relatively small pressure force in the closed position. The valve body can therefore be configured with a relatively low mass, which makes it possible to accelerate it very rapidly within a short time, without strong driving forces being required for this.

It is of particular advantage if the surface area delimited by the at least one sealing line that is subjected to a differential pressure in the closed state of the closing valve is smaller than one fifth of a circular area having a circumference corresponding to the total length of all the sealing lines.

The at least one sealing line may be formed for example as a star or clover leaf, in order on the one hand to seal the external air inlet over a great length and release it over a great length when the closing valve is opened, so that a great quantity of external air can flow into the suction line within a short time when the closing valve is opened, and in order on the other hand to ensure that the sealing line only delimits a relatively small surface area that is subjected to the differential pressure in the closed position of the closing valve.

Alternatively, it may be provided that a number of sealing lines form closed sealing rings. The sealing rings may be disposed next to one another, but preferably concentrically in relation to one another. In particular, it may be provided that the sealing rings are of a round configuration. They may be disposed in a common plane or else in planes that are offset or tilted in relation to one another.

In order that a great amount of external air can flow into the suction line within a very short time when the at least one closing valve is opened, it is of advantage if the valve body has at least one through-opening, which is delimited by at least one sealing element in the closed position of the valve body. The provision of a through-opening in the valve body makes it possible to make part of the external air pass through the through-opening when the closing valve is opened, while another part of the external air can flow around the outside of the valve body.

It is of advantage if the at least one valve seat has a number of through-openings, which are respectively delimited by at least one sealing element in the closed position of the valve body. For example, it may be provided that the valve seat comprises two annular through-openings disposed concentrically in relation to one another and the valve body has one annular through-opening in a radially intermediate region between the two through-openings of the valve seat. If the valve body assumes its closed position, it covers the through-openings of the valve seat and the closing valve is tightly closed. If the valve body lifts off from the valve seat, it releases the through-openings of the valve seat and provides a further flow path for the inflowing external air via its through-opening disposed between the two through-openings of the valve seat.

In the case of a preferred embodiment, the valve body is subjected to a closing force by means of a closing spring and is kept in its closed position by means of an electromagnet, in particular a holding solenoid. The holding solenoid is distinguished by very low remanence, so that the magnetic force falls sharply within a very short time as a result of interruption of the current supply, and the valve body is brought up very close to the solenoid by the closing spring, so that it can be kept in its closed position by the magnetic field.

In the case of an advantageous embodiment, a very brief opening movement of the valve body is ensured by the valve body being continuously movable from its closed position via its open position back into its closed position when the closing valve is opened. The valve body consequently does not assume a rest position in its open position, it merely performs a movement back and forth, from its closed position via the open position back into the closed position, when the closing valve is opened. Such a movement can be ensured, for example, by the valve body interacting with a closing spring which, when the closing valve is opened, absorbs the energy of the valve body, decelerates it and accelerates it once again in the direction of its closed position, so that it again comes within the range of the electromagnet. Here, the closing spring may have a non-linear characteristic, so that at the beginning the movement of the valve body is only minimally inhibited and, as a result, a maximum pressure surge by means of the external air is made possible. The closing spring may be formed as one part or more than one part, in particular two parts.

In order to ensure that the valve body does not cant when the closing valve opens, it is advantageous if the valve body is displaceably held in a cylindrical guide. The provision of a cylindrical guide allows the valve body to turn about the cylinder axis, without its opening and closing movement being impaired as a result.

The following description of a preferred embodiment of the invention serves for more detailed explanation in conjunction with the drawings.

DETAILED DESCRIPTION OF THE INVENTION

Figure 1:
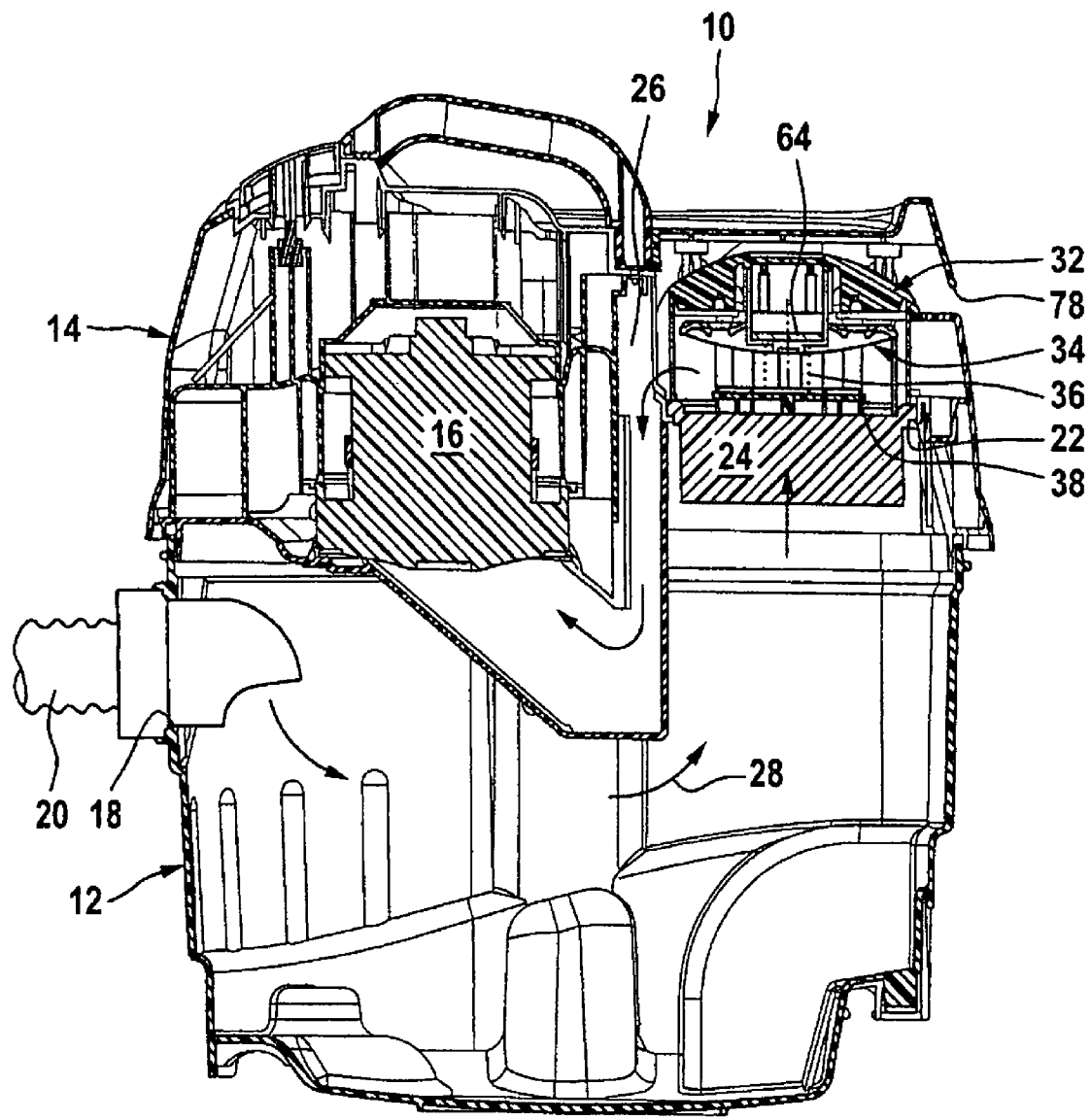
FIG. 1 shows a schematic sectional view of a suction cleaning device according to the invention.

Schematically represented in the drawing is a vacuum cleaner 10, with a dirt collecting container 12, mounted on which is an upper part 14, which accommodates a suction unit 16. The dirt collecting container 12 has a volume of approximately 80 l, preferably a volume of about 30 l to approximately 80 l. It comprises a suction inlet 18, connected to which is a suction tube 20, at the free end of which (not represented in the drawing to achieve a better overview) a suction nozzle may be located. Alternatively, it may be provided that the suction tube 20 is connected to a working tool, for example a power drill or a masonry router, so that dust produced during the operation of the working tool can be sucked away.

The upper part 14 forms a suction outlet 22 for the dirt collecting container 12, a folded filter 24 being held on the suction outlet 22, which filter is followed by a suction line in the form of a suction channel 26, via which the folded filter 24 is in flow communication with the suction unit 16. By way of the suction channel 26 and the folded filter 24, the dirt collecting container 12 can be acted on by negative pressure from the suction unit 16, so that a suction flow is formed, symbolized in FIG. 1 by the arrows 28, under the effect of which dirt can be sucked into the dirt collecting container 12. By means of the folded filter 24, the dirt particles can be separated from the suction flow 28.

Figure 2:
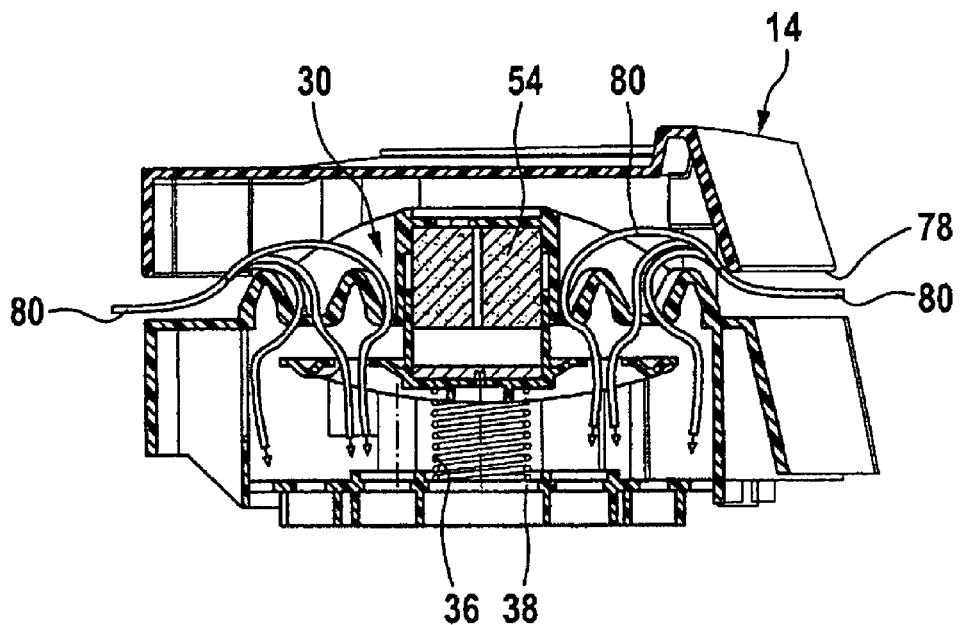
FIG. 2 shows an enlarged sectional view of the suction cleaning device from FIG. 1 in the region of a closing valve.

Disposed above the folded filter 24 in the upper part 14 is a closing valve 30, which is shown enlarged in FIG. 2. It comprises a valve holder 32, which is fixedly disposed in the upper part 14, forms a valve seat and interacts with a valve body in the form of a valve disk 34. The valve disk 34 is subjected to a closing force in the direction of the valve holder 32 by means of a closing spring 36 with a non-linear characteristic. The closing spring 36 is restrained between a plate-like filter holder 38, fixedly disposed in the upper part 14, and the valve disk 34.

Figure 3:
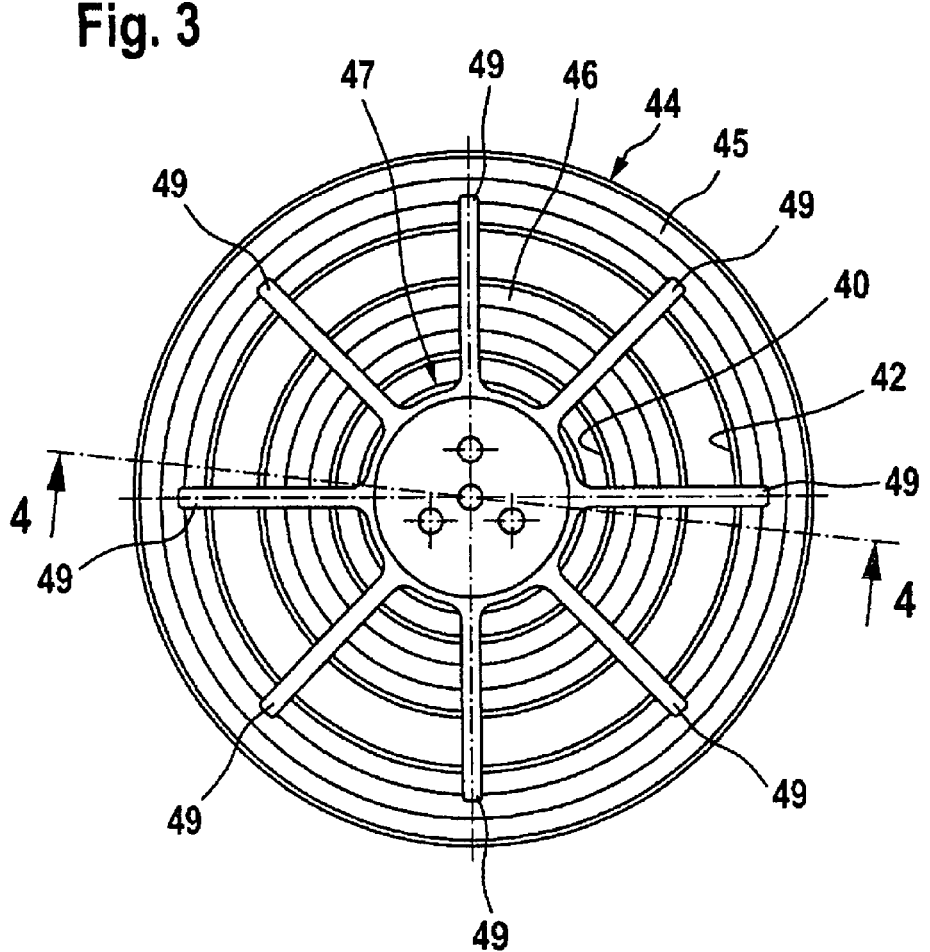
FIG. 3 shows a plan view of a detail of a valve holder of the closing valve.
Figure 4:
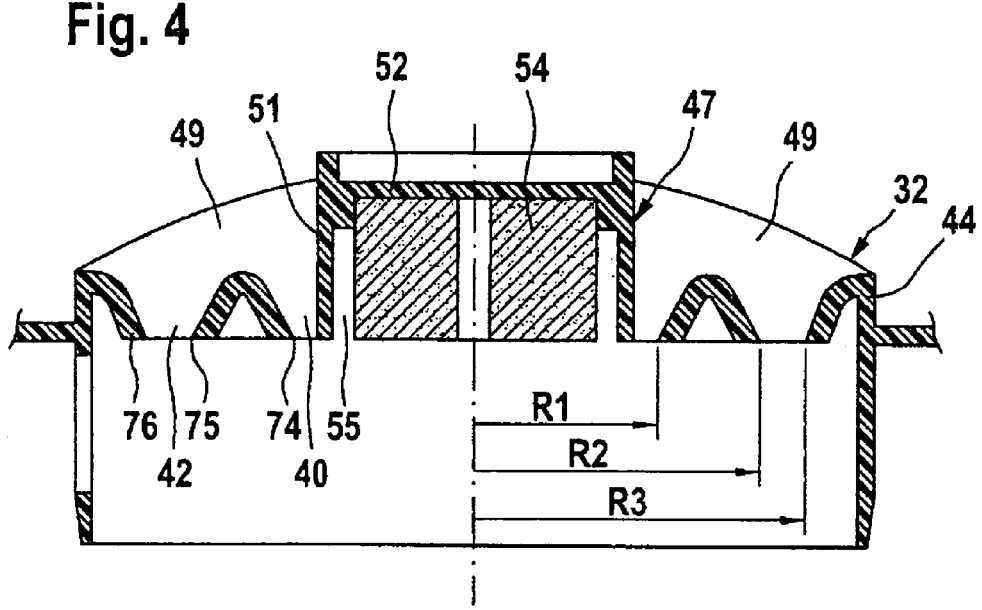
FIG. 4 shows a sectional view along the line 4-4 in FIG. 3.
Figure 5:
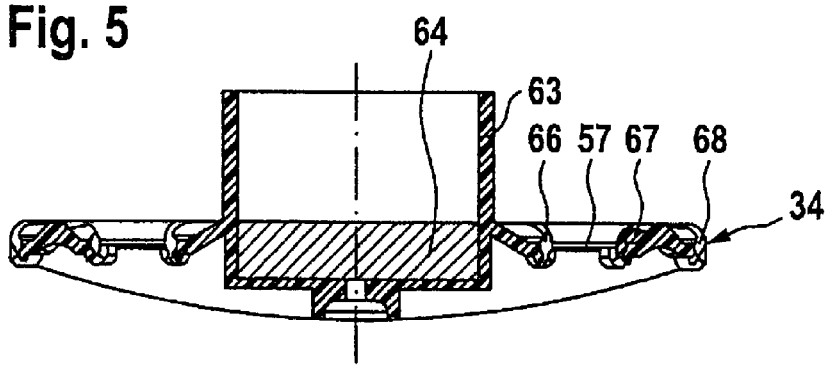
FIG. 5 shows a sectional view of a valve body of the closing valve.
Figure 6:
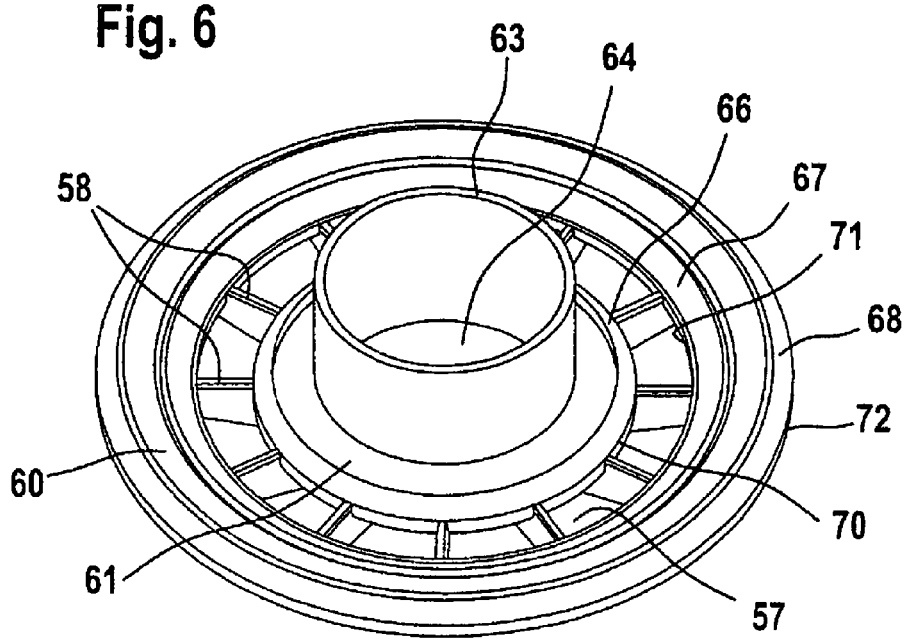
FIG. 6 shows a pictorial representation of the valve body from FIG. 5.

As becomes clear in particular from FIGS. 3 and 4, the valve holder 32 has two annular through-openings 40, 42, which are concentric to one another and are tightly closed by the valve disk 34 in the closed position of the closing valve 30. The through-openings 40 and 42 form an external air inlet and are formed in a holding disk 44 of the valve holder 32, the holding disk 44 being subdivided by the through-openings 40 and 42 into an outer ring 45 and an inner ring 46, which concentrically surround a cylindrical middle part 47 and are fixed on the middle part 47 by means of holding ribs 49 protruding from the outside of the middle part 47 in a radial direction.

The middle part 47 comprises a hollow-cylindrical shell 51, which is covered on the upper side by an end wall 52 and accommodates a holding solenoid 54. The latter is surrounded within the middle part 47 by an annular space 55 and is in electrical connection with a control unit of the vacuum cleaner 10 (not represented in the drawing) via connecting cables (likewise not represented in the drawing).

The valve disk 34 has an annular through-opening 57, which is reached through by a multiplicity of radially directed supporting ribs 58, which connect an outer ring region 60 of the valve disk 34 to a circular central region 61 of the valve disk 34. Protruding upward from the central region 61 in the direction of the middle part 47 of the valve holder 32 is a guide sleeve 63, which enters the annular space 55 of the valve holder 32 and accommodates an iron plate 64, which is adhesively secured in the guide sleeve 63.

On its upper side oriented toward the valve holder 32, the valve disk 34 carries an inner sealing ring 66, a middle sealing ring 67 and an outer sealing ring 68, which are aligned concentrically in relation to one another and form a sealing lip in each case. The inner sealing ring 66 runs along an inner edge 70 of the through-opening 57, the middle sealing ring 67 runs along an outer edge 71 of the through-opening 57 and the outer sealing ring 68 runs along the outer periphery 72 of the valve disk 34.

In the closed position of the valve disk 34, the inner sealing ring 66 comes to lie in a sealing manner against the outer edge 74 of the through-opening 40 of the valve holder 32, and the middle sealing ring 67 and the outer sealing ring 68 respectively come to lie in a sealing manner against an inner edge 75 and an outer edge 76 of the through-opening 42. The sealing rings 66, 67 and 68 consequently define annular sealing lines that delimit a surface area subjected to the pressure difference forming at the closing valve 30. The inner sealing ring 66 delimits here a first, circular partial area with a radius R1, and the sealing rings 67 and 68 delimit a second, annular partial area with an inner radius R2 and an outer radius R3. Altogether, the closing valve 30 consequently has a sealing line defined by the sealing rings 66, 67 and 68, of a length made up by the sum of the lengths of the sealing rings 66, 67 and 68. The sealing line formed in this way delimits a surface area subjected to the pressure difference forming at the closing valve 30, made up by the sum of the first and second partial areas explained. The square of the total length of the sealing line is greater than 25 times the surface area delimited by the sealing line. Compared with a circular area having a circumference corresponding to the total length of the sealing line, the surface area delimited by the sealing line is significantly smaller than 50% of the circular area. This has the consequence that an intensive external air flow can form when the closing valve 30 is opened, as a result of which the negative pressure falls abruptly in the region between the folded filter 24 and the closing valve 30, so that the folded filter 24 is subjected to a pressure surge and for a short time is flowed through by external air counter to the suction flow 28, which can flow into the upper part 14 via an external air feed in the form of a lateral opening 78. The external air flow is illustrated in FIG. 2 by the arrows 80.

Figure 7:
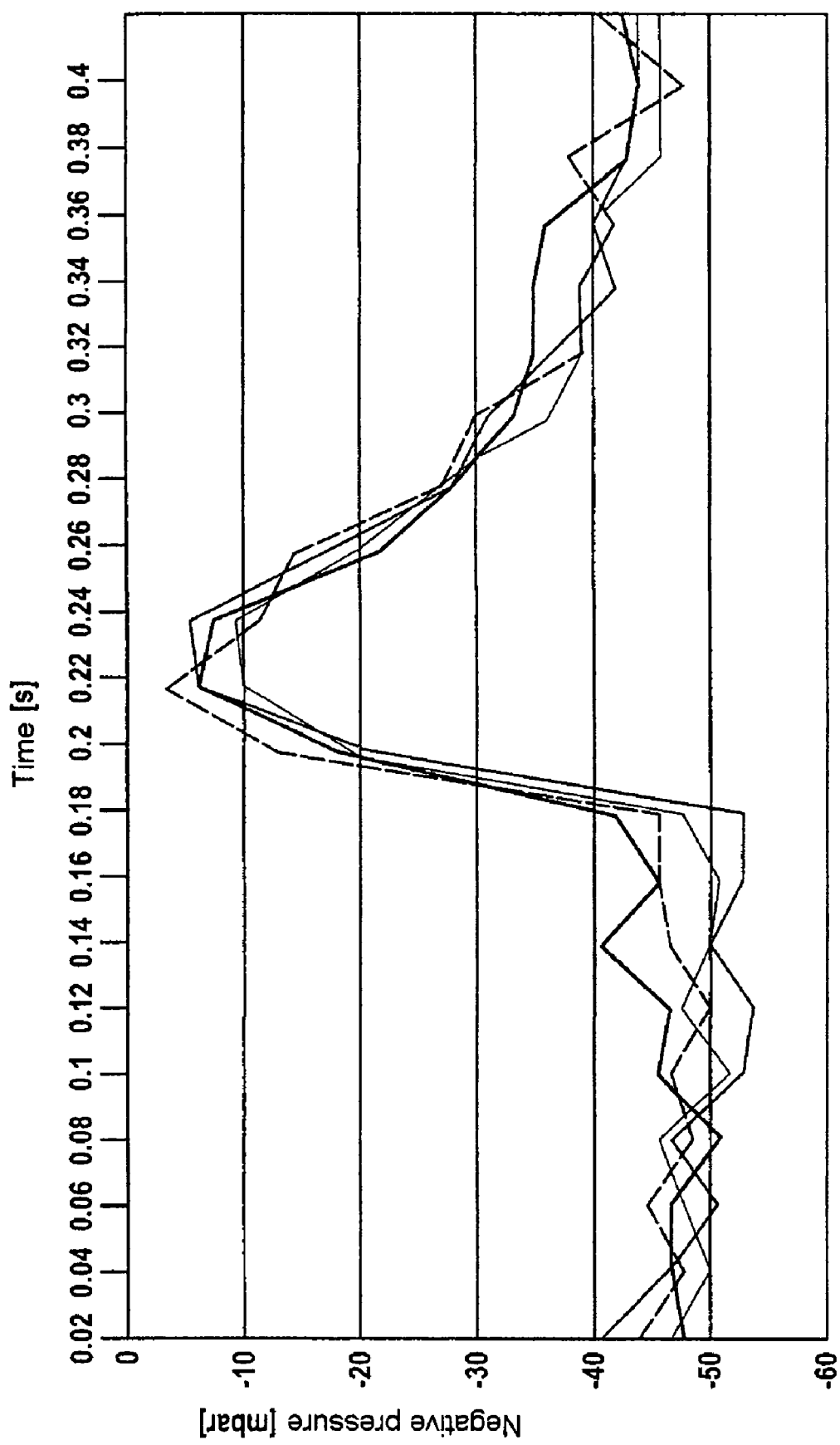
FIG. 7 shows the behavior of the negative pressure forming in the region of the mouth of a suction tube connected to the suction cleaning device when the closing valve is actuated.

If the closing valve 30 assumes its closed position, a negative pressure forms in the dirt collecting container 12 and in the suction channel 26. If a suction tube with a length of 2.5 m and an internal diameter of 35 mm is connected to the suction inlet 18, the negative pressure in the region of the mouth of the suction tube, to be specific at a distance of 3 cm from the suction inlet 18, is approximately 50 mbar, provided that no tool or suction nozzle is connected to the free end of the suction tube. FIG. 7 shows the variation of corresponding pressure measurements. If the current supply to the holding solenoid 54 is interrupted for the actuation of the closing valve 30, the magnetic force with which the iron plate 64 is held on the holding solenoid is abruptly cut off. This has the consequence that the valve disk 34 lifts off from the valve holder 32 under the effect of the pressure difference forming at the closing valve 30 counter to the closing force of the closing spring 36. The closing spring 36 takes up the energy of the valve disk 34, decelerates it and subsequently accelerates it back again, so that within a short time it resumes its closed position and closes the through-openings 40 and 42 of the valve holder 32. During the movement of the valve disk 34, the external air flow 80 forms, with the consequence that the negative pressure in the region of the mouth of the suction tube falls very sharply within approximately 40 to about 60 ms. Since, however, the valve disk 34 has then already resumed its closed position and the external air that has flowed in is sucked away by the suction unit 16, the negative pressure subsequently increases again, to assume virtually its original value of about 50 mbar after approximately 200 ms. Values below 400% of the value forming when the closing valve 30 is closed, that is to say values of less than 20 mbar, are assumed by the negative pressure in the region of the mouth of the suction tube only for a time period of about 60 ms. This has the consequence that virtually continuous suction operation is maintained for the user and reliable filter cleaning is nevertheless ensured. Here, the closing valve has a compact configuration, with a small overall form, and can be produced at low cost.

The invention claimed is:

1. Method for cleaning the filters of a vacuum cleaner, wherein the vacuum cleaner comprises:
 a dirt collecting container with a suction inlet,
 a suction tube connected to the suction inlet,
 at least one suction unit in connection with the dirt collecting container via at least one filter for creating a negative pressure in the suction tube,
 at least one suction line following the at least one filter,
 an external air inlet connecting the at least one suction line to an external air supply, and
 at least one closing valve for closing the external air inlet, the method, for cleaning the at least one filter, comprises:
 opening the at least one closing valve such that a side of the at least one filter that is oriented away from the dirt collecting container is impinged upon by external air, wherein:
  by simultaneously opening all the closing valves, the negative pressure that forms within the suction tube at a distance of 3 cm from the suction inlet is lowered for at least 10 ms and at most 150 ms to values of less than 40% of the value forming when the closing valves are closed; and
  the suction tube being 2.5 m long and open at its free end with an internal diameter of 35 mm.

2. Method according to claim 1, wherein the vacuum cleaner is equipped with a single filter.

3. Method according to claim 1, wherein an entire surface area of the at least one filter that is oriented away from the dirt collecting container is impinged upon by external air by the opening of only one of the at least one closing valve.

4. Method according to claim 1, wherein the at least one closing valve is electronically actuated.

5. Method according to claim 1, wherein the at least one closing valve is actuated in a time-controlled manner.

6. Method according to claim 5, wherein the at least one closing valve is actuated at time intervals of less than 30 seconds.

7. Method according to claim 5, wherein the at least one closing valve is actuated at different time intervals.

8. Method according to claim 1, wherein the at least one closing valve is electronically actuated in dependence on a pressure difference forming at the at least one filter when the closing valve is closed.

9. Vacuum cleaner comprising,
- a dirt collecting container with a suction inlet,
- a suction tube connected to the suction inlet,
- at least one suction unit which is in connection with the dirt collecting container via at least one filter for creating a negative pressure in the suction tube,
- at least one suction line following the at least one filter,
- an external air inlet, via which the at least one suction line is connected to an external air supply, and
- at least one closing valve for closing the external air inlet, the at least one closing valve having at least one fixed valve seat and a movable valve body, wherein:
- by simultaneously opening all the closing valves, the negative pressure that forms within the suction tube at a distance of 3 cm from the suction inlet is lowered for at least 10 ms and at most 150 ms to values of less than 40% of the value forming when the closing valves are closed, and
- the suction tube being 2.5 m long and open at its free end with an internal diameter of 35 mm.

10. Vacuum cleaner according to claim 9, wherein the vacuum cleaner has a single filter.

11. Vacuum cleaner according to claim 9, wherein the valve body is adapted to be brought into sealing contact with the at least one valve seat while forming one or more sealing lines, a surface area delimited by the sealing lines being at most half the size of a circular area having a circumference corresponding to a total length of all the sealing lines.

12. Vacuum cleaner according to claim 11, wherein the surface area delimited by the at least one sealing line, which is subjected to a differential pressure in a closed state of the at least one closing valve, is smaller than one fifth of a circular area having a circumference corresponding to the total length of all the sealing lines.

13. Vacuum cleaner according to claim 11, wherein the sealing lines form a number of closed sealing rings.

14. Vacuum cleaner according to claim 9, wherein the valve body has at least one through-opening, which is delimited by at least one sealing element in a closed position of the valve body.

15. Vacuum cleaner according to one of claim 9, wherein the valve seat has a number of through-openings, which are respectively delimited by at least one sealing element in a closed position of the valve body.

16. Vacuum cleaner according to claim 9, wherein the valve body is subjected to a closing force by means of a closing spring and is kept in a closed position by means of an electromagnet.

17. Vacuum cleaner according to one of claim 9, wherein the valve body is continuously movable from a closed position via an open position back into the closed position when the closing valve is opened.

18. Vacuum cleaner according to one of claim 9, wherein the valve body is displaceably held in a cylindrical guide.

* * * * *